May 19, 1931.  E. A. ROCKWELL  1,806,220
VALVE OPERATING MECHANISM
Filed June 8, 1926   2 Sheets-Sheet 1
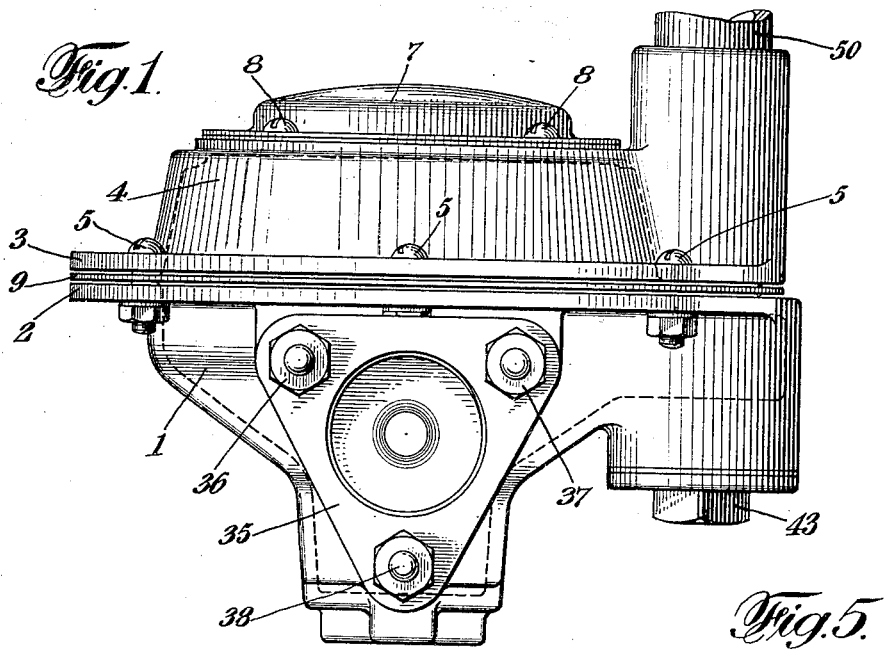
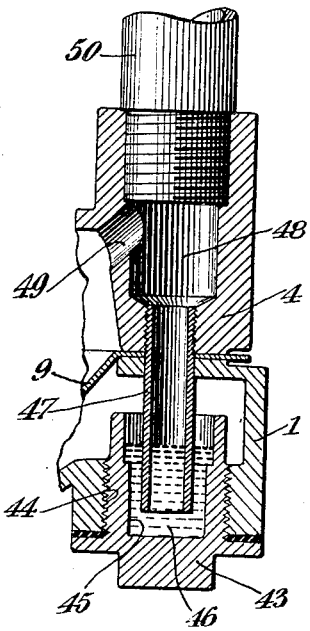
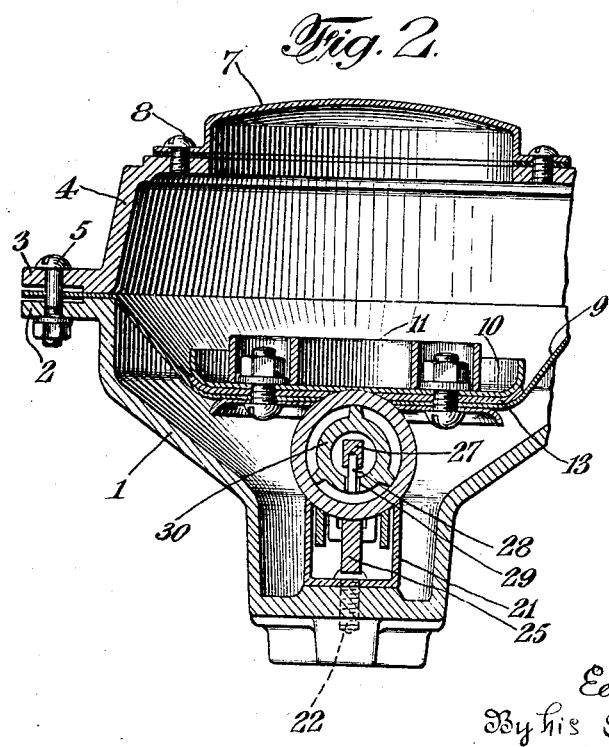
Inventor
Edward A. Rockwell
By his Attorneys

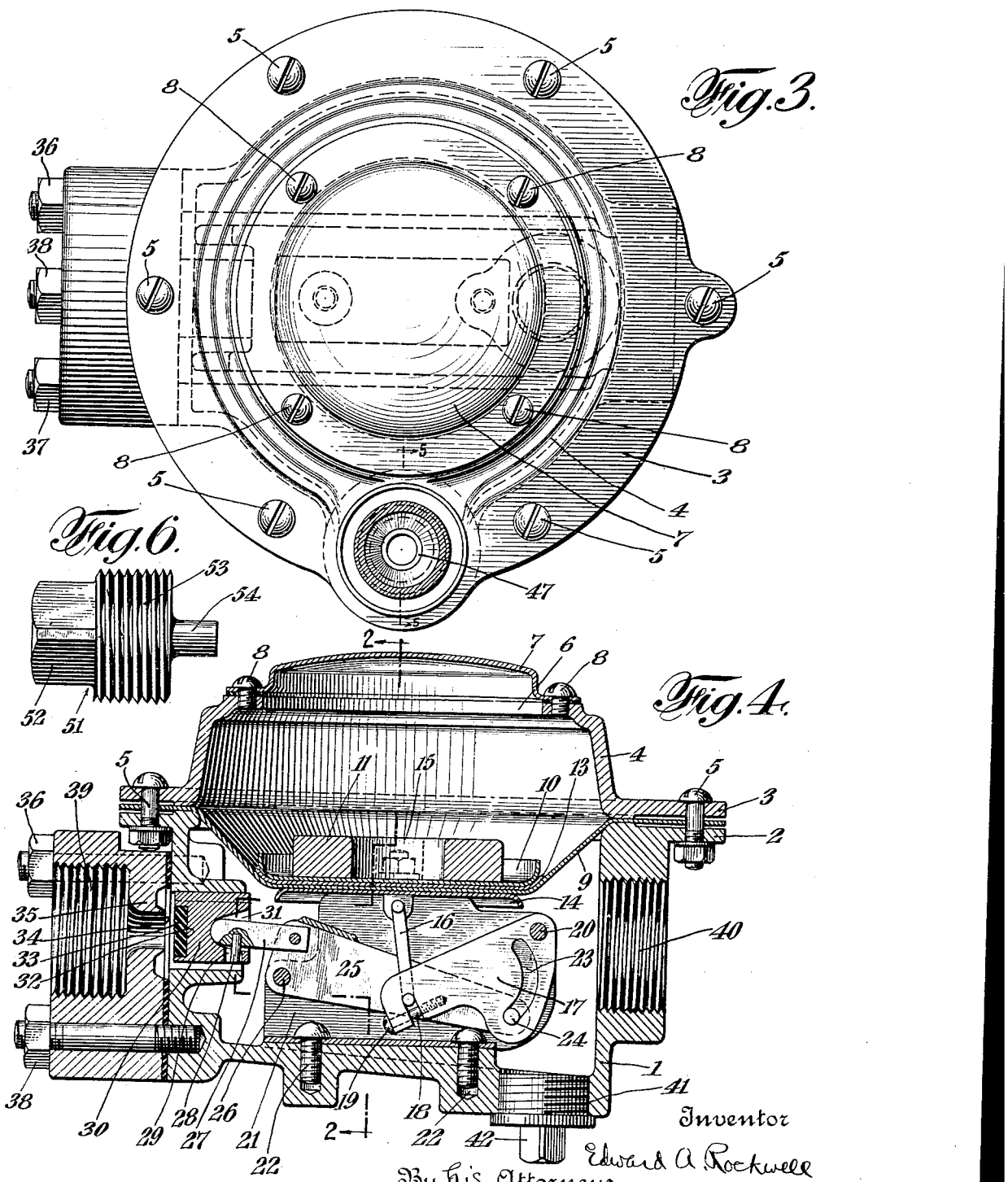

Patented May 19, 1931

1,806,220

UNITED STATES PATENT OFFICE

EDWARD A. ROCKWELL, OF NEW YORK, N. Y.

VALVE OPERATING MECHANISM

Application filed June 8, 1926. Serial No. 114,584.

My invention relates to a device for operating valves by means of pressures controlling the position of the same, and relates to many different types of apparatus in which such valves may be used, as, for example, fluid control systems, gas pressure systems, steam supply systems, carburetors, etc. It has relation especially, however, to a valve closing mechanism for gas governors.

The object of my invention is to provide a valve operating mechanism having a maximum closing pressure in the closing position of the valve and a maximum width of opening in the open position of the same. Hitherto in valve closing devices, especially as applied to gas governors, when attempts were made to provide a device with mechanism to apply a high closing pressure, this has resulted in a construction in which the width of opening was small through the range of opening movement of the valve. This was especially true in positions of the valve, not only at its widest point of opening, but, also, in the initial opening and final closing positions of the valve. In other forms of construction hitherto provided for this purpose, furthermore, a manual adjustment of leverage ratios was necessary according to the different ranges of gas pressures in different gas supply systems. Accordingly, with my apparatus the valve closing mechanism will not only adapt itself to a very great range of supply pressures and volumes with which it is to be used, but, likewise, the apparatus can be made smaller and, therefore, at a lower cost for a given supply pressure with which it is to be used, than in the case of governors previously available for this purpose. In general, I accomplish this result by providing an apparatus having a variable leverage ratio for operating the valve in which the high leverage for closing the valve becomes applicable at a point only very near the closed position of the valve. In other words, a device made in accordance with my invention has an automatically varying leverage ratio in which the ratio of approximately 1:17 is applied in the closing position of the valve, whereas in the fully opened position of the same the ratio is 1:1. In the preferred form of my invention this variable leverage is obtained by using a sliding fulcrum between the two levers with the aid of a pin and slot connection, the slot being so chosen as to apply the greatest available leverage in the closed position of the valve while avoiding such an angle between the pin and slot as would result in a sticking taper.

While my invention is capable of embodiment in many different forms for the purpose of illustration I have shown only one form of the same in the accompanying drawings, in which—

Figure 1 is a side elevation of a gas governor made in accordance with my invention;

Figure 2 is a vertical section of a portion of the same taken on line 2—2 of Figure 4;

Figure 3 is a plan view of the same;

Figure 4 is a vertical section of the governor;

Figure 5 is a vertical section of a portion of the same taken on line 5—5 of Figure 4, and Figure 6 is a side elevation of a wooden plug adapted to be used in the apparatus when not in use, as, for example, in shipping.

In the drawings, I have shown a gas governor having a main casing 1 made of a casting of iron or any other desired metal. This is provided with an annular flange 2 by means of which it is secured to a flange 3 of a diaphragm housing 4 by several bolts 5. The housing 4 has an opening 5 at the top closed with a removable cover 7 secured in place by screws 8. The flanges 2 and 3 also hold in place a sheepskin diaphragm 9 having a cup-shaped member 10 at the top of the same to receive an annular weight 11 of any desired amount, which may be inserted through the opening 6, to control the limits of movement of the diaphragm 9. The cup-shaped member is supported from the diaphragm 9 by means of a gasket 13 and is secured to a flanged-disk 14 on the underside of the diaphragm 9 by means of a bolt 15 which pivotally supports a link 16.

The lower end of the link 16 communicates the movement of the diaphragm 9 to a lever 17 made of brass, which has a slot 18, closed by a screw 19 for the insertion of the link 16. The lever 17 has a fixed pivot 20 with which it is connected to a bracket 21 secured by screws 22 to the main casing 1. In the said lever 17, furthermore, there is a slot 23 to provide an automatically adjustable pivotal connection with a pin 24 of Monel metal carried by a lever 25 having a fixed pivot 26 on the bracket 21. The said lever 25 is, furthermore, pivotally connected to a bar 27 carrying a pin 28 adapted to be received in a slot 29 in a valve 30 which has a recess 31 for receiving the thrust from the rounded forward end of the bar 27. The bar 27 and the pin 28 thereon are so constructed that when assembled they may be inserted into and removed from the slot 29, when desired. This construction also allows angular movement of the valve 30 in seating. The face of said valve 30 has a recess 32 in which there is carried a leather washer 33 which may be treated in any suitable manner so as to prevent the escape of the gas through the valve. The washer 33 is designed to be seated against a valve seat 34 on a spud 35 which is given a fixed position with regard the casing 1 and the valve 30, by means of three bolts 36, 37 and 38, which, it will be noted, are not equidistant, so that the spud may be removed independently of the valve 30 and will always be returned to the same position with regard to said valve 30. The spud 35 is also provided with a screw-thread 39 to receive the inlet pipe from the gas supply system.

The gas is thus supplied through the opening 39 and is delivered to the consumer through an outlet opening 40 which may be connected to a delivery pipe in the usual way. Adjacent to the outlet 40 there is, also, provided an outlet 41 to act as a drain for oil, but which may be used as an additional outlet for gas, if desired. This outlet 41 is normally closed by means of a plug 42.

For safety purposes, and especially owing to the legal requirements in some localities, the main casing 1 is, also, provided with means for relieving any excessive pressures in the form of a mercury seal. This is comprised of a screw-threaded plug 43 adapted to be received in an opening 44 in the casing 1, said plug 43 having a cup-shaped chamber 45 containing a body of mercury 46 in which there is sealed a depending pipe 47 screw-threaded to the diaphragm housing 4 and communicating with a vent-opening 48 therein. The vent-opening 48 also communicates with a passageway 49 leading to the space above the diaphragm 9 and is connected with a vent-pipe 50 leading to the outer air. In shipping the apparatus, because of the low ratios of the leverage in the opened position of the valve the parts can be readily held in place by means of a shipping-block such as a wooden plug 51 which may have a square head 52 and a screw-thread 53 to fit in the screw-threaded opening 39, as well as a cylindrical extension 54 adapted to fit against the face of the washer 33 to force the lever mechanism into its completely open position.

In the operation of my apparatus, gas, as for example illuminating gas, is supplied at a given range of pressures through the inlet opening 39. The pressure of the gas will be exerted against the diaphragm 9 in opposition to the force of the weight 11 and will, also, pass out of the governor through the outlet opening 40 as long as the gas is being withdrawn for use and until the force of the weight 11 has been overcome by the pressure of the gas within the governor. When said force has been overcome the diaphragm 9 will be raised, thereby elevating the lever 17 and consequently removing the lever 25 upwardly therewith. In the upward movement of the lever 25, however, the pin 24 will gradually slide along the slot 23. The movement along said slot 23 will increase in rapidity, however, as the valve 30 approaches the valve seal 34. The leverage ratio at the beginning of this movement is 1:1 and in the final closed position of the valve 30 the ratio is 1:17 approximately. Furthermore, the shape of the slot 23 is such that the higher ratios which become effective in the closing movement are approached only gradually during the movement of the valve until very near the final closed position when the levers rapidly bring the high leverage position into action. The effect of this is to retain the valve 30 in its wide open position as far as possible until near the end of the closing movement. In the movement of the diaphragm 9 the air above the same is allowed to escape and reenter through the breather opening 49. In case of any excessive pressure occurring in the governor, this will be relieved by means of the mercury seal, through the pipe 47 and to the vent-pipe 50. It will be noted that the capacity of the tube 47 is substantially the same as the volume of mercury carried in the cup-shaped chamber 46 above the lower end of the tube 47, in order that the tube 47 may adequately accommodate the quantity of mercury forced upwardly into the same and yet not exert an unnecessary head of pressure on the mercury when forced into the same.

While I have described my invention above in detail I wish it to be understood that many changes may be made therein without departing from the spirit of the same.

I claim:

1. A valve operating mechanism comprising an inlet for fluid pressure, a valve for controlling the same, a leverage mechanism for operating the valve having a low leverage ratio in the open position of the same, and a shipping block for holding the valve in open position.

2. A valve operating mechanism comprising an inlet for fluid pressure, a valve for controlling the same, a leverage mechanism for operating the valve having a variable lever-arm ratio in the closing movement thereof, and having a low leverage ratio in the open position of the same, and a shipping block for holding the valve in open position.

3. A valve operating mechanism comprising an inlet for fluid pressure, a valve for controlling the same adapted to close in opposition to the fluid pressure, a fluid controlled member for operating said valve, and a curved-surface camming mechanism connecting said member to the valve, adapted to exert an increasing pressure to close the valve.

4. A valve operating mechanism comprising an inlet for fluid pressure, a valve for controlling the same adapted to close in opposition to the fluid pressure, a fluid controlled member for operating said valve, and a camming mechanism comprising a lever and a cam surface running crosswise of the same connecting said member to the valve, adapted to exert an increasing pressure to close the valve.

In testimony that I claim the foregoing, I have hereunto set my hand this 27th day of May, 1926.

EDWARD A. ROCKWELL.